US008388196B2

(12) United States Patent
Wang

(10) Patent No.: US 8,388,196 B2
(45) Date of Patent: Mar. 5, 2013

(54) HEAT DISSIPATOR AND LED ILLUMINATOR HAVING HEAT DISSIPATOR

(75) Inventor: Chin-Wen Wang, Pingzhen (TW)

(73) Assignees: Chin-Wen Wang, Taoyuan County (TW); Ching-Chung Wang, Taoyuan County (TW)

( * ) Notice: Subject to any disclaimer, the term of this patent is extended or adjusted under 35 U.S.C. 154(b) by 126 days.

(21) Appl. No.: 13/160,607

(22) Filed: Jun. 15, 2011

(65) Prior Publication Data

US 2012/0320589 A1 Dec. 20, 2012

(51) Int. Cl.
*B60Q 1/06* (2006.01)
*F21V 11/00* (2006.01)

(52) U.S. Cl. .................... 362/373; 362/249.02; 362/294

(58) Field of Classification Search ............. 362/249.02, 362/294, 373; 165/80.1, 80.2, 80.3, 104.11
See application file for complete search history.

(56) References Cited

U.S. PATENT DOCUMENTS

| | | | | |
|---|---|---|---|---|
| 6,830,098 | B1 * | 12/2004 | Todd et al. | 165/104.33 |
| 7,771,090 | B2 * | 8/2010 | Chang et al. | 362/294 |
| 7,878,691 | B2 * | 2/2011 | Liang | 362/373 |
| 7,922,371 | B2 * | 4/2011 | Qin | 362/373 |
| 7,967,473 | B2 * | 6/2011 | Huang et al. | 362/294 |
| 7,976,197 | B2 * | 7/2011 | Chen | 362/294 |
| 8,206,010 | B2 * | 6/2012 | Chen | 362/294 |
| 2008/0043479 | A1 * | 2/2008 | Wang | 362/373 |
| 2009/0059532 | A1 * | 3/2009 | Li et al. | 361/709 |
| 2009/0244985 | A1 * | 10/2009 | Chen et al. | 365/185.29 |
| 2009/0268463 | A1 * | 10/2009 | Huang et al. | 362/249.02 |
| 2009/0310381 | A1 * | 12/2009 | Chang et al. | 362/555 |
| 2010/0014299 | A1 * | 1/2010 | Qin | 362/373 |
| 2010/0271819 | A1 * | 10/2010 | Kristoffersen et al. | 362/235 |

* cited by examiner

*Primary Examiner* — John A Ward
(74) *Attorney, Agent, or Firm* — Chung-Ming Shih; HDLS IPR Services

(57) ABSTRACT

A heat dissipator having a heat-conducting substrate and a plurality of heat-dissipating columns is disclosed. The heat-conducting substrate is opened with a plurality of through-holes. Each of the heat-dissipating columns is discretely set on a surface of the heat-conducting substrate. An illuminator having the heat dissipator and an LED illuminating module is also disclosed. The LED illuminating module is fixed on the heat-conducting substrate and includes a circuit board and a plurality of LEDs arranged on the circuit board. This arrangement can increase the surface area for heat exchange with surrounding air and enhance the heat-dissipating efficiency of the heat dissipator.

20 Claims, 11 Drawing Sheets

HEAT DISSIPATOR AND LED ILLUMINATOR HAVING HEAT DISSIPATOR

BACKGROUND

1. Technical Field

The present invention relates to an illuminator, and more particularly, to a heat dissipator and an LED illuminator having the heat dissipator.

2. Related Art

In recent years, light-emitting-diode (LED) related technologies have been advanced greatly and are now much more mature than years ago. Because LEDs have low power consumption, long life, small volume, and fast response, they have been taking over traditional illuminators' market share gradually. However, the heat accumulation problem, which is one of the key factors affecting LEDs' life, remains. To resolve this problem, manufacturers are eager to develop heat dissipators and related products for LEDs.

Generally speaking, a conventional LED illuminator includes an aluminum-extruded heat dissipator and an LED illuminating module. The aluminum-extruded heat dissipator has a base plate and a plurality of fins extending upward from a side of the base plate. Each of the fins has a stripe shape and there is a heat-dissipating path between each two adjacent fins. The LED illuminating module is fixed on the base plate to conduct heat to the base plate.

However, conventional LED illuminators face the following problems. Each of the fins has a stripe shape, and hence has only a limited surface area to exchange heat with surrounding air. Furthermore, it's more likely that some wind directions will result in dead spaces. Because the base plate is closed, the air above and below the plate cannot exchange heat efficiently. In addition, when the LED illuminator is installed in an outdoor place, the upper surface of the base plate will accumulate mud and dust, which will negatively affect the heat-dissipating efficiency.

BRIEF SUMMARY

The present invention discloses a heat dissipator and an LED illuminator having the heat dissipator. The heat-dissipating columns, which are discretely arranged, can enlarge the surface area for heat exchange with surrounding air and hence result in greater heat dissipating efficiency.

A heat dissipator is disclosed, which includes a heat-conducting substrate and a plurality of heat-dissipating columns. The heat-conducting substrate is opened with a plurality of through-holes; each of the heat-dissipating columns is discretely set on a surface of the heat-conducting substrate.

An LED illuminator having a heat dissipator is disclosed. The LED illuminator includes the heat dissipator and an LED illuminating module. The heat dissipator includes a heat-conducting substrate and a plurality of heat-dissipating columns. The heat-conducting substrate is opened with a plurality of through-holes. Each of the heat-dissipating columns is discretely set on a surface of the heat-conducting substrate. The LED illuminating module is fixed on the heat-conducting substrate, and includes a circuit board and a plurality of LEDs arranged on the circuit board.

The through-holes not only enhance the heat exchange between the heat-conducting substrate and surrounding cold air, but also reduce the overall weight. The even arrangement of the heat-dissipating columns reduces/eliminates the number of dead points in heat-dissipation and enhances the heat-dissipation efficiency. In addition to serving as a heat-dissipating passageway, each of the through-holes can also serve as a washing channel. Therefore, the through-holes can effectively reduce the accumulation of dust and dirt. Furthermore, because each of the heat-dissipating columns can either be opened with a dissecting trough or form a hollow column, the overall weight can be reduced and the surface area for heat exchange with surrounding air can be enlarged.

DETAILED DESCRIPTION

Figure 1:
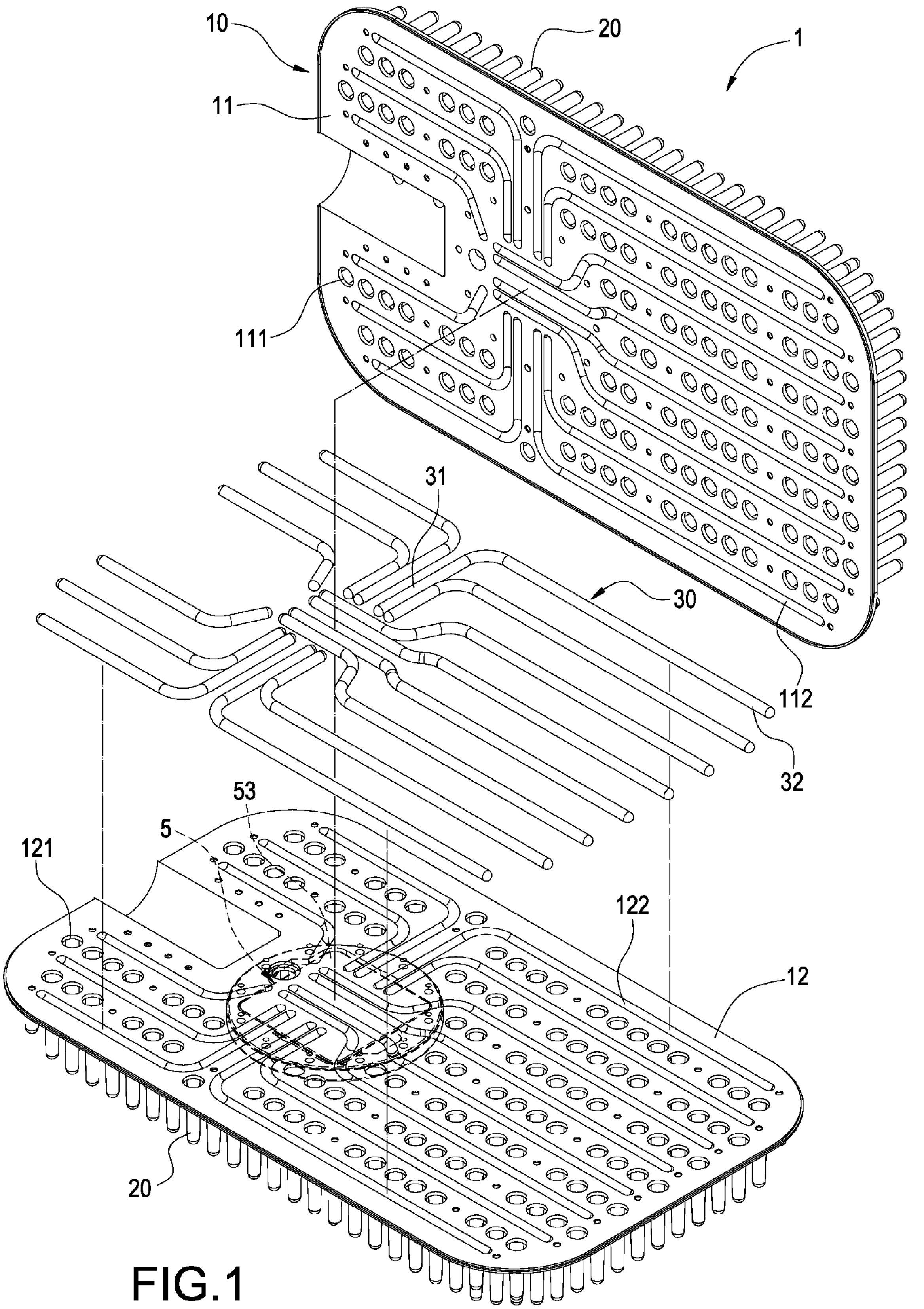
FIG. 1 shows a three-dimensional exploded view of the first embodiment of the present invention.

Please refer to FIG. 1 to FIG. 7. An embodiment of the present invention's LED illuminator mainly includes a heat dissipator 1 and an LED illuminating module 5.

The heat dissipator 1 includes a heat-conducting substrate 10 and a plurality of heat-dissipating columns 20. In this embodiment, the heat-conducting substrate 10 is formed by an upper substrate 11 and a lower substrate 12. Both the upper and lower substrates 11 and 12 are rectangular and are made up of copper, aluminum, their alloy, or other material that has good heat-conductivity. On the upper and lower substrates 11 and 12, there are a plurality of through-holes 111 and a plurality of through-holes 112, respectively. The through-holes 111 on the upper substrate 11 correspond to the through-holes 121 on the lower substrate 12. These through-holes 111 and 121 are arranged in several rows. Furthermore, on the lower surface of the upper substrate 11 and the upper surface of the lower substrate 12, where the two surfaces are to be combined together, there are a plurality of slot ways 112 and 122 arranged between adjacent rows of through-holes 111 and 121, respectively.

Figure 4:
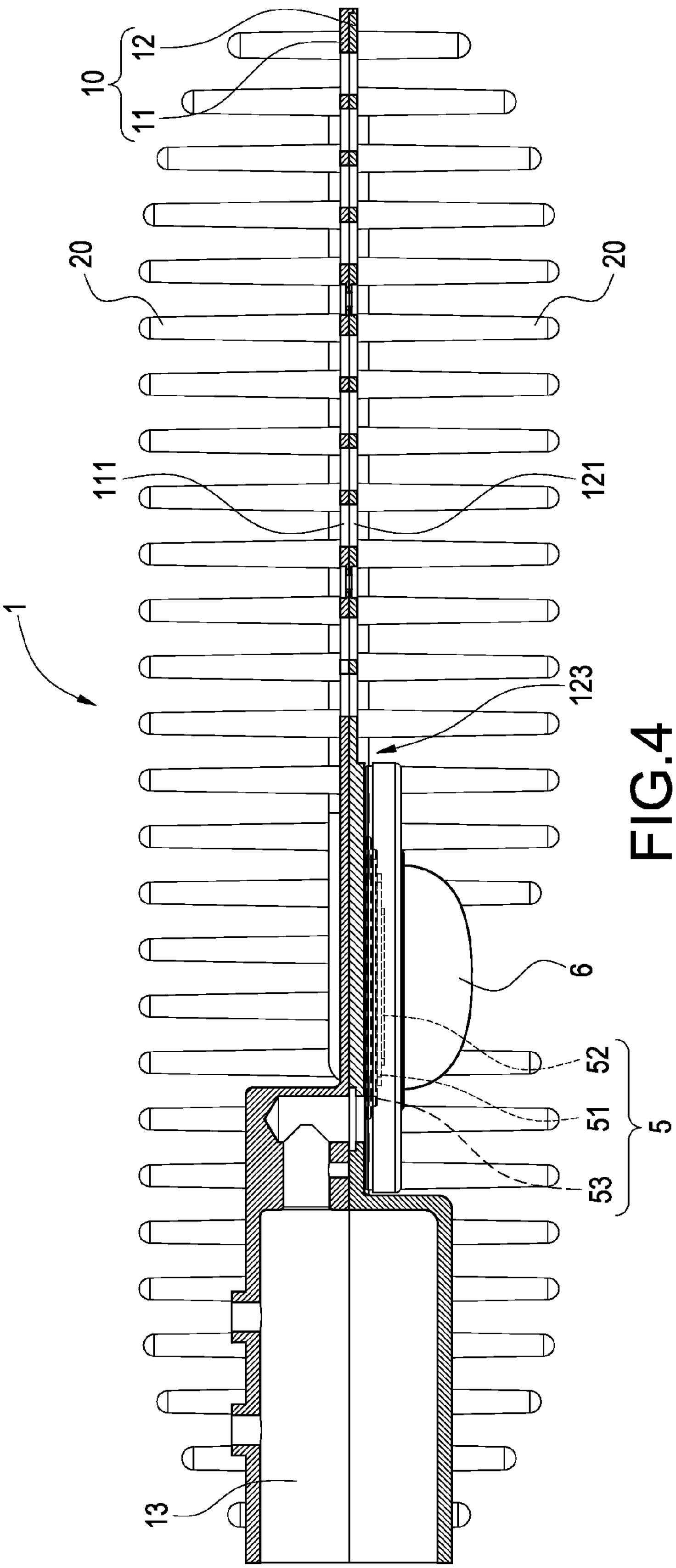
FIG. 4 shows a sectional view along the line 4-4 of FIG. 3.
Figure 5:
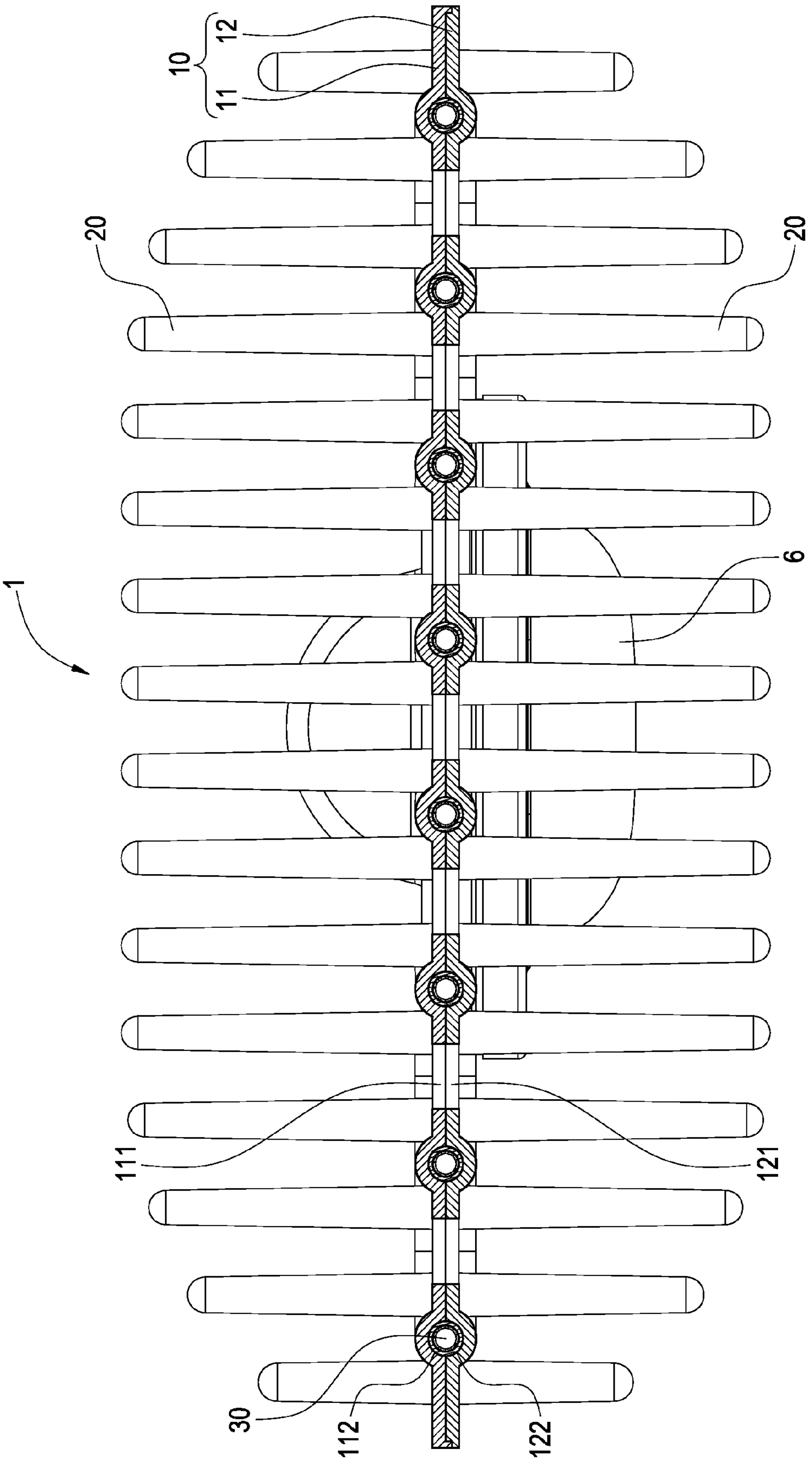
FIG. 5 shows a sectional view along the line 5-5 of FIG. 3.
Figure 6:
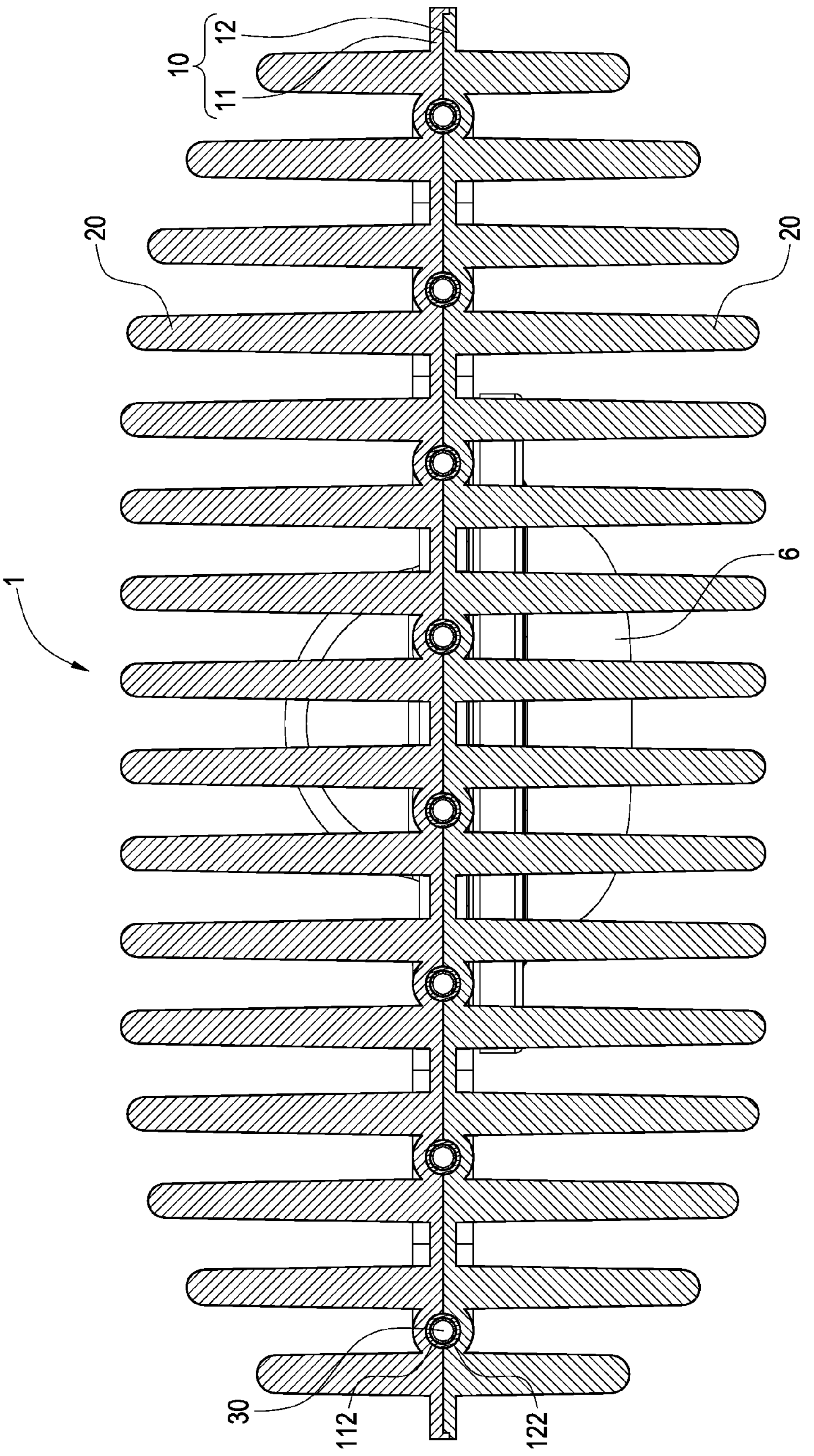
FIG. 6 shows a sectional view along the line 6-6 of FIG. 3.
Figure 7:
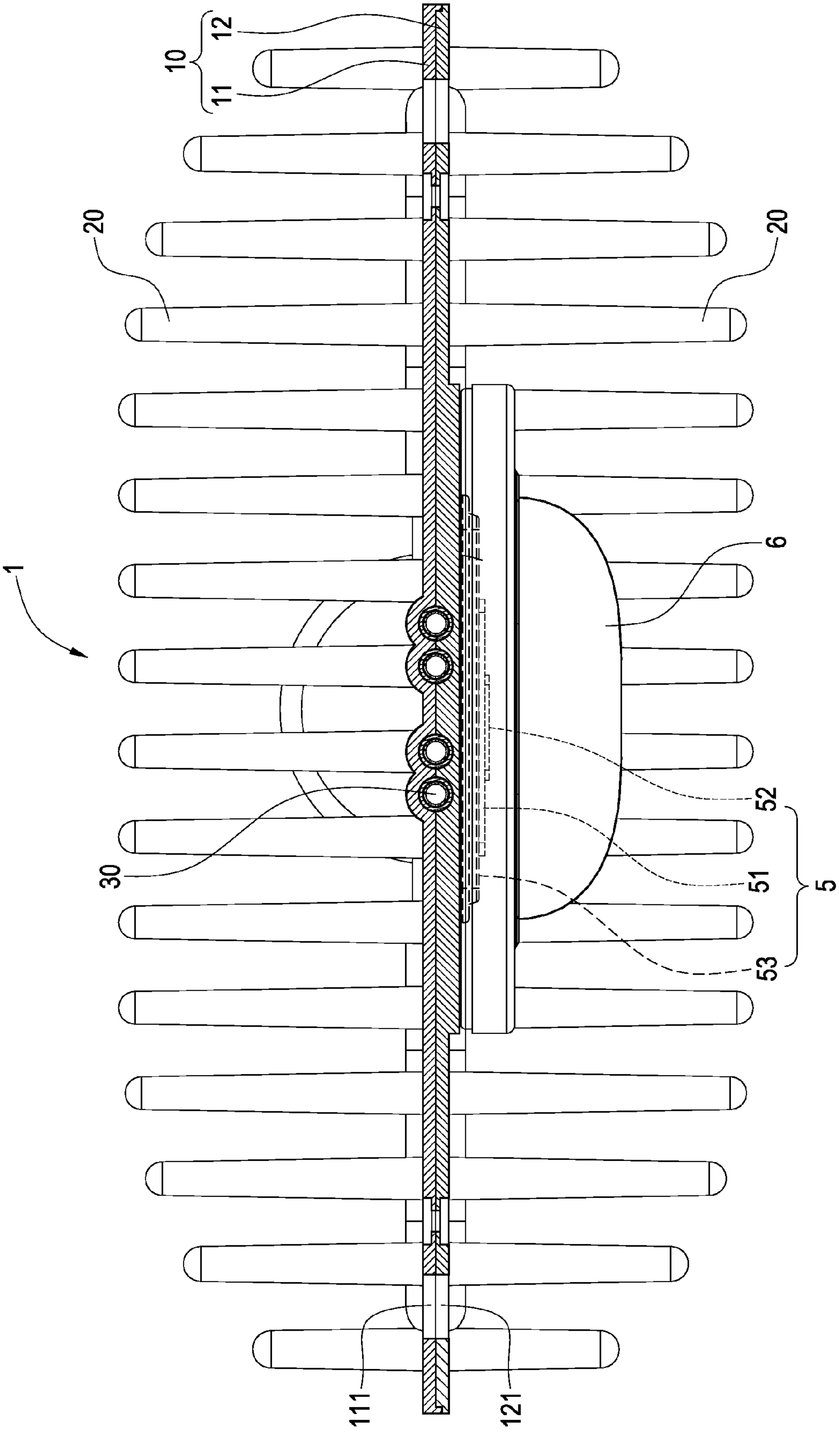
FIG. 7 shows a sectional view along the line 7-7 of FIG. 3.

The heat-dissipating columns 20 are formed on the upper surface of the upper substrate 11 and the lower surface of the lower substrate 12. In one embodiment, the upper substrate 11 and the heat-dissipating columns 20 thereon form an integrated part, where the lower substrate 12 and the heat-dissipating columns 20 thereon form another integrated part. In another embodiment, the heat-dissipating columns 20 are manufactured first and then mounted onto the upper and lower substrates 11 and 12. As shown in FIG. 6, the heat-dissipating columns 20 can be solid columns and arranged along the sides of the slot ways 112 and 122. Furthermore, as shown in FIG. 5, each row of the heat-dissipating columns 20 locates beside corresponding rows of through-holes 111 and 121. As shown in FIG. 4, there is a containing area 123 formed in between those heat-dissipating columns 20 in the center area of the lower surface of the lower substrate 12. This containing area 123 allows the LED illuminating module 5 to be installed and fixed thereon. An end of each of the slot ways 122 is directly above the containing area 123.

Figure 2:
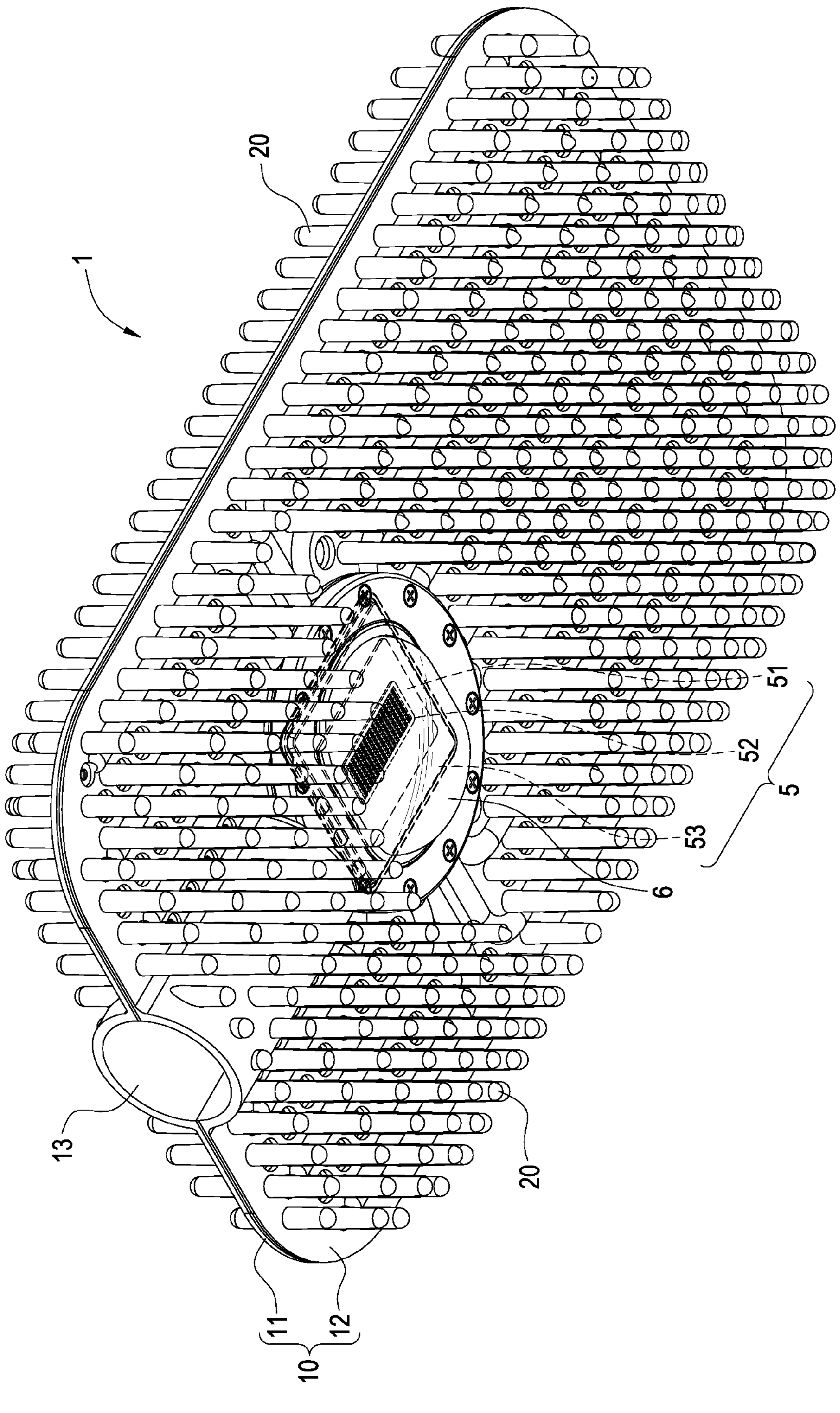
FIG. 2 shows an external view of the first embodiment of the present invention after combination.
Figure 3:
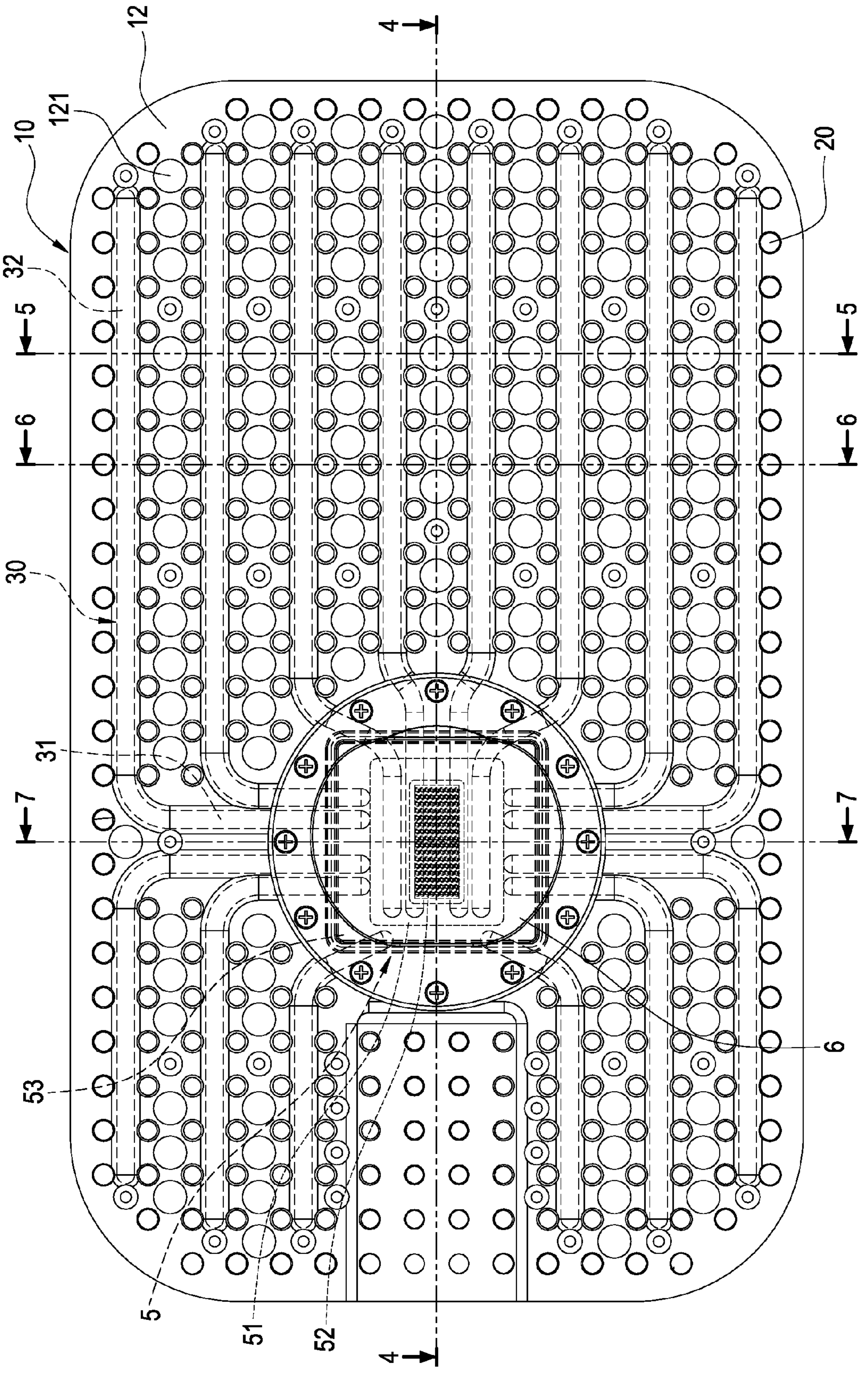
FIG. 3 shows a top view of the first embodiment of the present invention after combination.

In addition, the heat dissipator 1 further includes a plurality of heat pipes 30. Each of the heat pipes 30 contains capillary structure and working fluid. The air-liquid phase change of the working fluid and the liquid circulation facilitated by the capillary structure create continuous heat flow. Each of the heat pipes 30 has an evaporating section 31 and a condensing section 32 extending from the evaporating section 31. As shown in FIG. 6, the heat pipes 30 are set within the slot ways 112 and 122, and are clipped and hence fastened by the upper and lower substrates 11 and 12. As shown in FIG. 3, the evaporating sections 31 are contained within the slot ways 112 and 122 directly above the containing area 123. Furthermore, as shown in FIG. 2, a ferruling hole 13 is formed on a lateral side of the upper and lower substrates 11 and 12, after the two sides' combination.

The LED illuminating module 5 primarily includes a circuit board 51, a plurality of LEDs 52, and a homeothermy plate 53. In this embodiment the homeothermy plate 53 is a vapor chamber. The circuit board 51 is a metal core printed circuit board (MCPCB). The LEDs 52 has a matrix-like arrangement on a surface of the circuit board 51. The homeothermy plate 53 also contains capillary structure, working fluid, and supporting structure. The air-liquid phase change of the working fluid and the liquid circulation facilitated by the capillary structure create continuous heat flow. A side of the homeothermy plate 53 conducts heat to the lower substrate 12 and the evaporating section 31 of each of the heat pipes 30. Another side of the homeothermy plate 53 allows the circuit board 51 to be fixed to and conducts heat from the LEDs 52.

In addition, the LED illuminator in this embodiment further includes a translucent cover 6. This translucent cover 6 covers the exterior of the LED illuminating module 5 and is fixed to the lower substrate 12. As a result, the components as a whole constitute an LED illuminator having a heat dissipator.

When in use, each of the LEDs 52 generates not only light but also heat. Some of the heat will be directly conducted to the homeothermy plate 53. After receiving the heat, the working fluid in the homeothermy plate 53 evaporates and become air. The air rapidly brings a lot of the heat to the cold end of the homeothermy plate 53, where the heat is then conducted to the heat-conducting substrate 10 and each of the heat pipes 30. Each of the heat pipes 30 then conduct the heat onto most of the area of the heat-conducting substrate 10. Each of the through-holes 111 and 121 on the heat-conducting substrate 10 exchanges heat with surrounding cold air. In addition, the large surface area of the heat-dissipating columns 20 further exchange a lot of heat with surrounding cold air. The overall result is that the heat dissipator 1 dissipates heats very efficiently.

Figure 8:
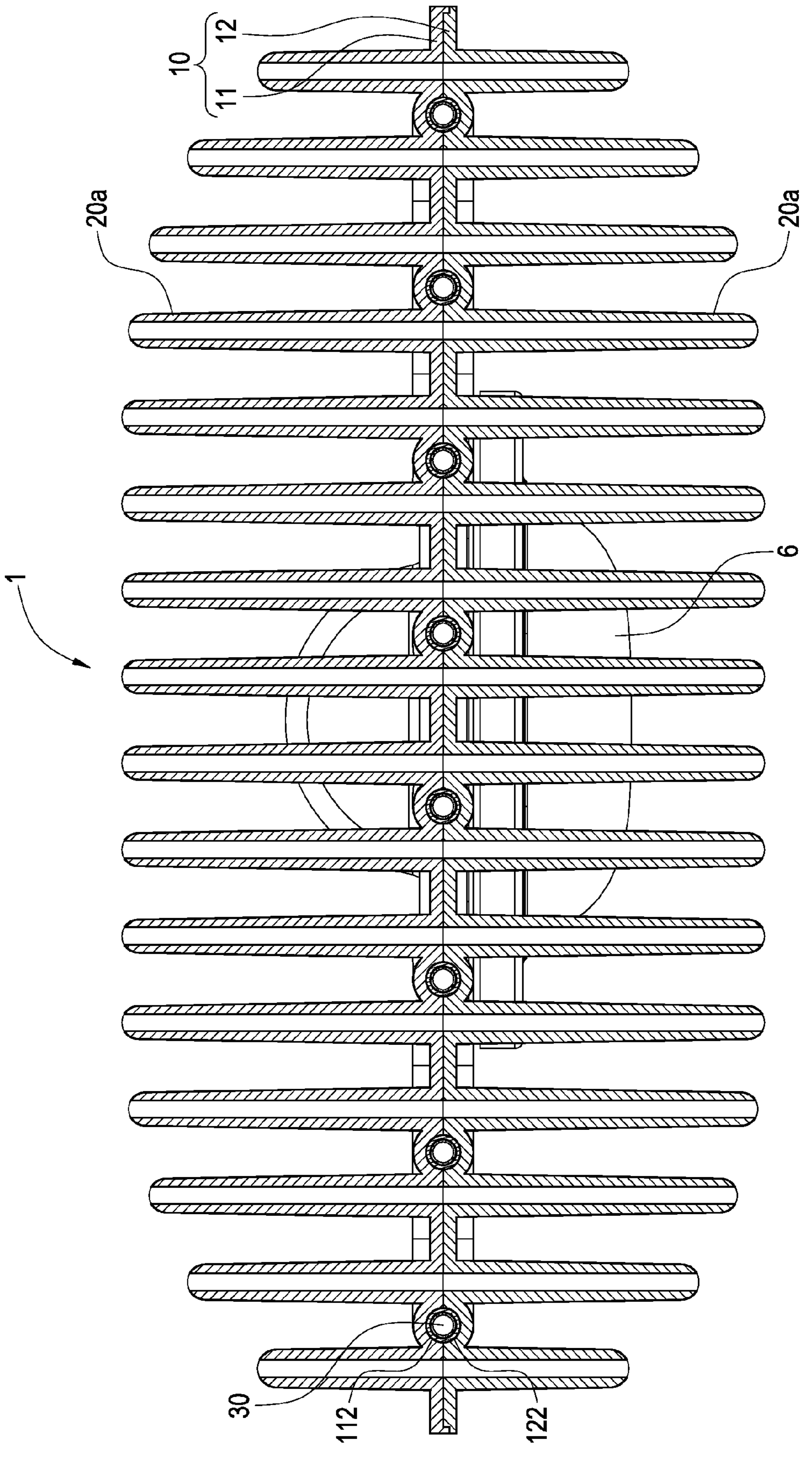
FIG. 8 shows a sectional view of the second embodiment of the present invention after combination.

Please refer to FIG. 8, which shows an LED illuminator according to a second embodiment of the present invention. A primary difference between this embodiment and the previous one is that in this embodiment, each of the heat-dissipating columns 20*a* extends from a surface of either the upper substrate 11 or the lower substrate 12, and is a hollow column. This characteristic not only greatly reduces the weight of the upper and lower substrates 11 and 12 and each of the heat-dissipating columns 20*a*, but also increases the surface area for heat-dissipation.

Figure 9:
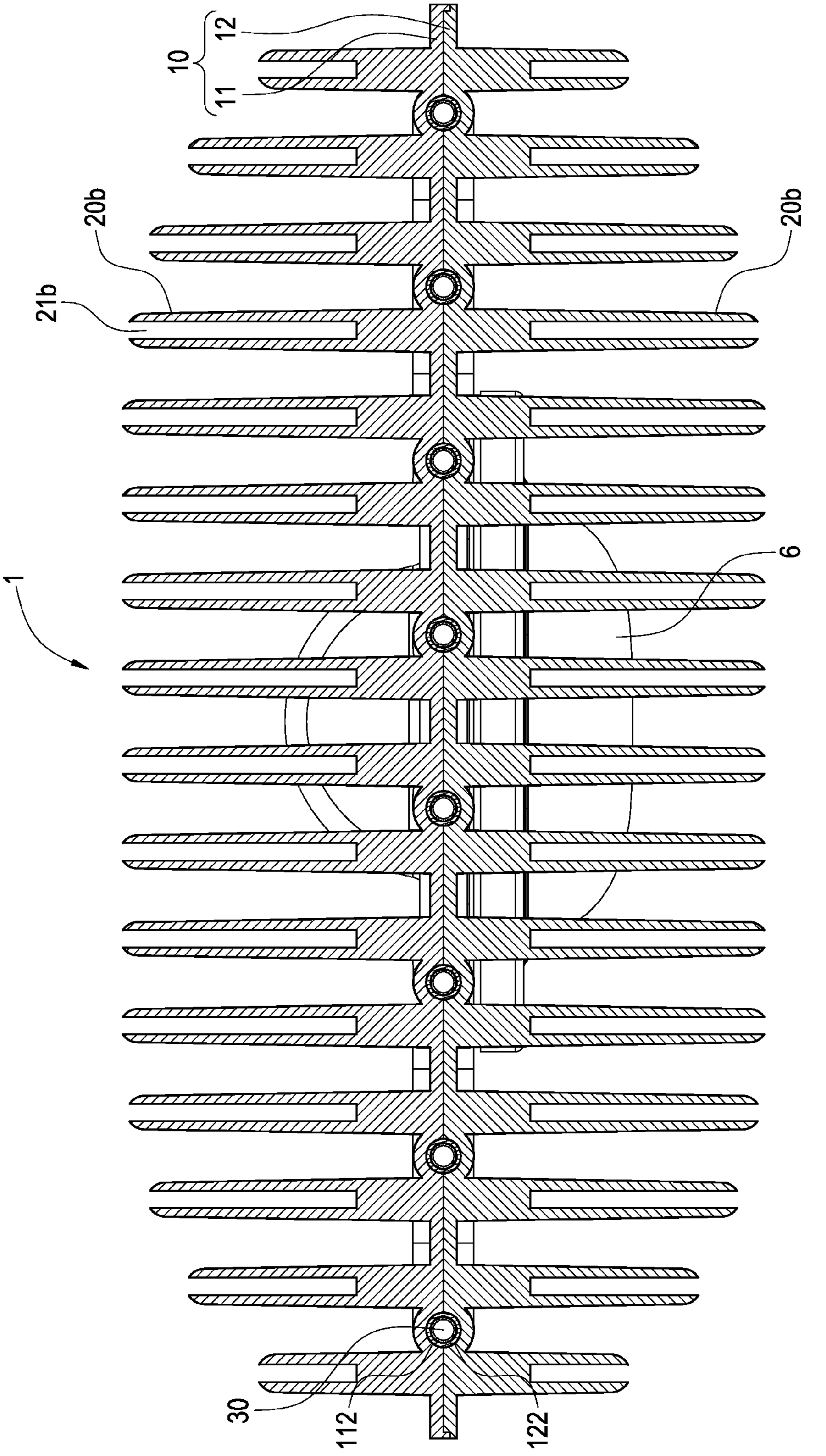
FIG. 9 shows a sectional view of the third embodiment of the present invention after combination.

Please refer to FIG. 9, which shows an LED illuminator according to a third embodiment of the present invention. A primary difference between this embodiment and the previous ones is that in this embodiment, each of the heat-dissipating columns 20*a* extends from a surface of either the upper substrate 11 or the lower substrate 12, and has a straight dissecting trough 21*b* in the column's center. The straight shape serves only as an example but not a limitation. The straight shape and other different shapes can reduce weight and increase surface area for heat-dissipation.

Figure 10:
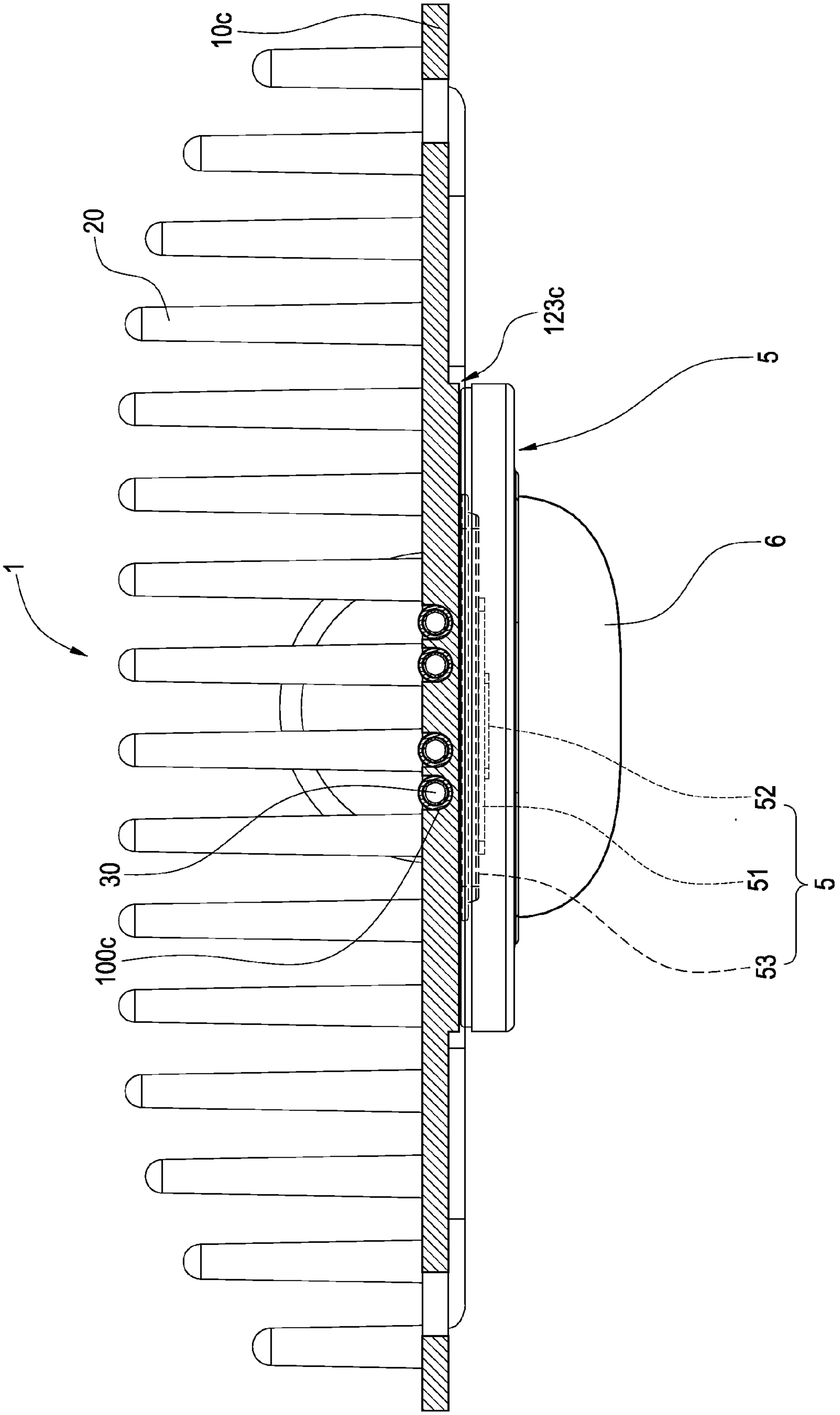
FIG. 10 shows a sectional view of the fourth embodiment of the present invention after combination.

Please refer to FIG. 10, which shows an LED illuminator according to a fourth embodiment of the present invention. A primary difference between this embodiment and the previous ones is that in this embodiment, the heat-conducting substrate 10*c* contains a single plate. Furthermore, a plurality of heat-dissipating columns 20 extends from a surface of the heat-conducting substrate 10*c*. A plurality of grooves 100*c* are opened on an area on the heat-conducting substrate 10*c* corresponding to the LED illuminating module 5. The grooves 100*c* allow the heat pipes 30 to be buried therein. The LED illuminating module 5 is fixed within the containing area 123*c*.

Figure 11:
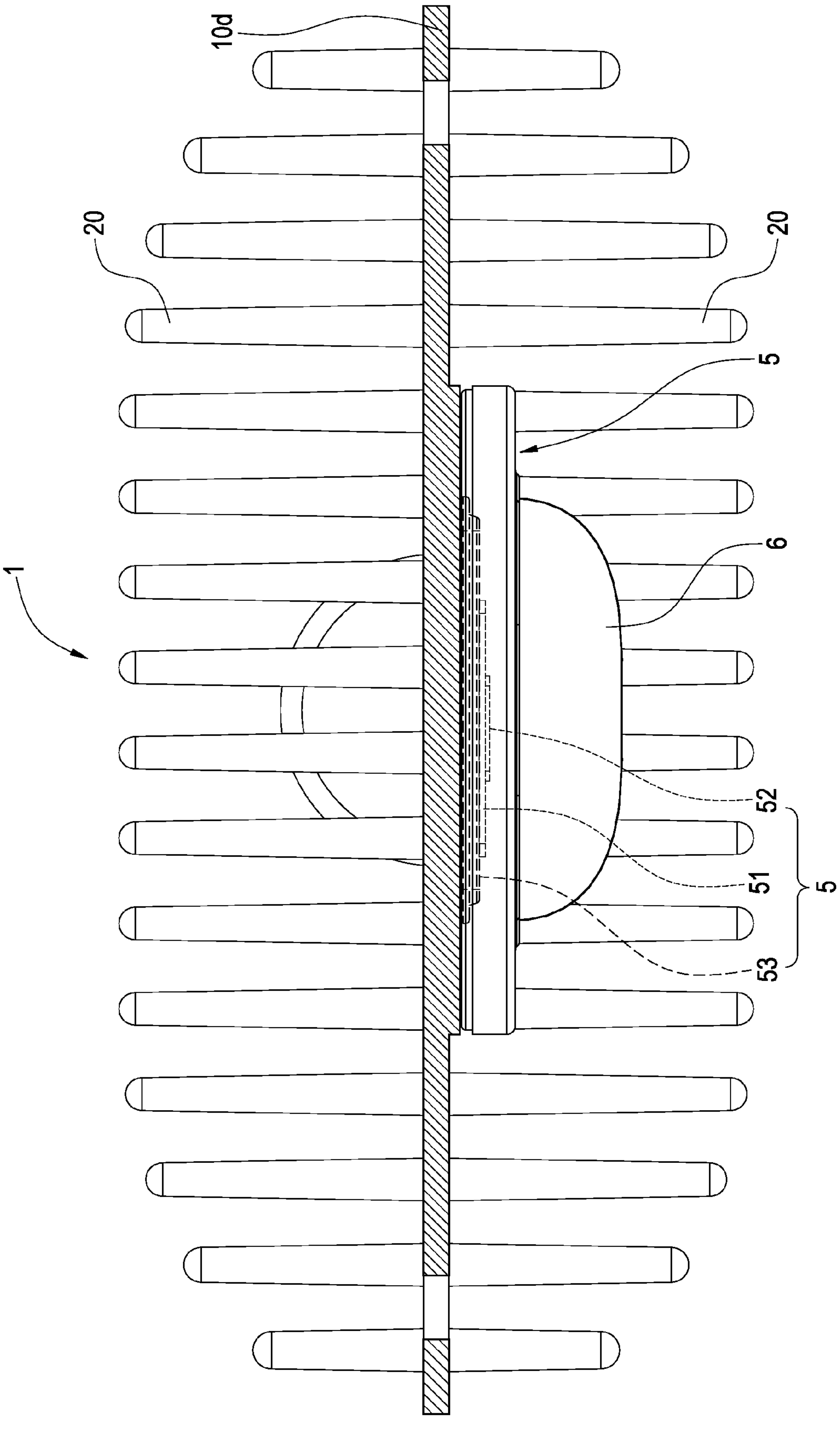
FIG. 11 shows a sectional view of the fifth embodiment of the present invention after combination.

Please refer to FIG. 11, which shows an LED illuminator according to a fifth embodiment of the present invention. A primary difference between this embodiment and the previous ones is that in this embodiment, the heat-conducting substrate 10*d* is formed by a single plate. A plurality of heat-dissipating columns 20 extends from the upper and lower surfaces of the heat-conducting substrate 10*d*. Furthermore, the homeothermy plate 53 of the illuminating module 5 is directly fixed to the lower surface of the heat-conducting substrate 10*d*.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A heat dissipator, comprising:

a heat-conducting substrate, opened with a plurality of through-holes; and a plurality of heat-dissipating columns, arranged on a surface of the heat-conducting substrate, each of the heat-dissipating columns being arranged discretely.

2. The heat dissipator of claim 1, wherein the heat-conducting substrate has an upper substrate and a lower substrate, which are combined together, the through-holes are opened on the upper and lower substrates correspondingly, the heat-dissipating columns are formed through extending from the upper surface of the upper substrate and the lower surface the lower substrate, a ferruling hole is formed on a lateral side of the upper and lower substrates after the two substrates' combination.

3. The heat dissipator of claim 2, further comprising a plurality of heat pipes, the upper and lower substrates being opened with a plurality of slot ways respectively, the heat pipes being buried within the slot ways.

4. The heat dissipator of claim 1, further comprising a plurality of heat pipes, the heat-conducting substrate being opened with a plurality of grooves, the heat pipes being contained within the grooves.

5. The heat dissipator of claim 1, wherein the heat-dissipating columns are solid.

6. The heat dissipator of claim 1, wherein the heat-dissipating columns are hollow.

7. The heat dissipator of claim 1, wherein the heat-dissipating columns are opened with dissecting troughs.

8. The heat dissipator of claim 1, wherein a containing area is formed on another surface of the heat-conducting substrate.

9. The heat dissipator of claim 1, wherein another surface of the heat-conducting substrate is connected to a plurality of heat-dissipating columns, and a containing area is formed between the heat-dissipating columns on that surface of the heat-conducting substrate.

10. An LED illuminator, comprising:

a heat dissipator, having a heat-conducting substrate and a plurality of heat-dissipating columns, the heat-conducting substrate being opened with a plurality of through-holes, each of the heat-dissipating columns being set discretely on a surface of the heat-conducting substrate; and an LED illuminating module, fixed on the heat-conducting substrate, the LED illuminating module having a circuit board and a plurality of LEDs arranged on the circuit board.

11. The LED illuminator of claim 10, wherein the heat-conducting substrate has an upper substrate and a lower substrate, which are combined together, the through-holes are opened on the upper and lower substrates correspondingly, the heat-dissipating columns are formed through extending from the upper surface of the upper substrate and the lower surface the lower substrate, a ferruling hole is formed on a lateral side of the upper and lower substrates after the two substrates' combination.

12. The LED illuminator of claim 11, wherein the heat dissipator further comprises a plurality of heat pipes, the upper and lower substrates are opened with a plurality of slot ways respectively, the heat pipes are buried within the slot ways.

13. The LED illuminator of claim 10, wherein the heat dissipator further comprises a plurality of heat pipes, the heat-conducting substrate are opened with a plurality of grooves, the heat pipes are contained within the grooves.

14. The LED illuminator of claim 10, wherein the heat-dissipating columns are solid.

15. The LED illuminator of claim 10, wherein the heat-dissipating columns are hollow.

16. The LED illuminator of claim 10, wherein the heat-dissipating columns are opened with dissecting troughs.

17. The LED illuminator of claim 10, wherein a containing area for containing the LED illuminating module is formed on another surface of the heat-conducting substrate.

18. The LED illuminator of claim 10, wherein another surface of the heat-conducting substrate is connected to a plurality of heat-dissipating columns, and a containing area for containing the LED illuminating module is formed between the heat-dissipating columns on that surface of the heat-conducting substrate.

19. The LED illuminator of claim 10, wherein the LED illuminating module further comprises a homeothermy plate stuck on the heat-conducting substrate, the homeothermy plate allows the circuit board to be fixed to.

20. The LED illuminator of claim 10, further comprising a translucent cover, the translucent cover covering the exterior of the LED illuminating module and being fixed on the heat-conducting substrate.

* * * * *